(12) United States Patent
Wang

(10) Patent No.: US 7,855,958 B2
(45) Date of Patent: Dec. 21, 2010

(54) DETERMINING PRIORITY OF BEARER CHANNELS IN A WIRELESS TELECOMMUNICATIONS NETWORK

(75) Inventor: Yalou Wang, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 787 days.

(21) Appl. No.: 11/498,554

(22) Filed: Aug. 3, 2006

(65) Prior Publication Data

US 2008/0031273 A1    Feb. 7, 2008

(51) Int. Cl.
    G01R 31/08    (2006.01)
    G06F 11/00    (2006.01)
    G08C 15/00    (2006.01)

(52) U.S. Cl. ..................... 370/230; 370/235

(58) Field of Classification Search .............. 370/230, 370/235, 444, 232
    See application file for complete search history.

(56) References Cited

U.S. PATENT DOCUMENTS

| | | | |
|---|---|---|---|
| 6,970,423 B2 * | 11/2005 | Chuah | 370/230 |
| 7,184,768 B2 * | 2/2007 | Hind et al. | 455/435.3 |
| 2001/0030998 A1 * | 10/2001 | Yong | 375/219 |
| 2005/0249117 A1 * | 11/2005 | Gerkins | 370/230 |
| 2007/0026811 A1 * | 2/2007 | Blume | 455/67.11 |
| 2007/0275728 A1 * | 11/2007 | Lohr et al. | 455/450 |

FOREIGN PATENT DOCUMENTS

| | | |
|---|---|---|
| EP | 1 608 194 | 12/2005 |
| WO | WO 98/43462 | 10/1998 |
| WO | PCT/US2007/016791 | 1/2008 |

* cited by examiner

*Primary Examiner*—Derrick W Ferris
*Assistant Examiner*—Maharishi Khirodhar

(57) ABSTRACT

A method is provided of determining priorities of radio bearer channels in a wireless telecommunications network that offers various predetermined levels of quality of service. The method involves determining a numerical value representing a priority rating to be applied to a radio bearer channel. This is done by assigning each of at least two quality of service attributes of the bearer channel with a respective numerical value, then processing the values to provide the priority rating for the bearer channel.

8 Claims, 3 Drawing Sheets

DETERMINING PRIORITY OF BEARER CHANNELS IN A WIRELESS TELECOMMUNICATIONS NETWORK

FIELD OF THE INVENTION

The present invention relates to telecommunications, in particular to wireless telecommunications.

DESCRIPTION OF THE RELATED ART

Third generation or higher networks include those broadly in accordance with Third Generation Partnership Project, 3GPP, standards, for example Universal Mobile Telecommunications System (UMTS) networks. In networks for wireless communications that are third generation or higher, many different types of service are possible, such as multimedia services. These services include applications that require real time transmission, such as voice and video streams. These services also include applications for which timing is less critical, such as web browsing, file downloading, and other data services.

In 3GPP or UMTS wireless networks, a call connection involves communication data flows, i.e. traffic, over one or more channels known as bearers or bearer channels. To successfully provide to users the various services outlined above, much effort has gone into how to ensure acceptable Quality of Service, QoS, for the various types of traffic. Basically, the bearers are handled with different priorities dependent on the type of traffic they are carrying. Therefore, it is important to decide with what QoS a bearer should be treated.

As detailed in Third Generation Partnership Project, 3GPP, Technical Specification TS23.107, many QoS attributes that are used to describe how a bearer should be treated have been defined by 3GPP standards. This is both for end-to-end UMTS bearers, and also for radio access bearers within them. End-to end UMTS bearers are those between mobile user terminal and a core network gateway. Radio access network bearers, often known as RAB bearers, relate to the portion of the data flow path from the mobile user terminal only as far as a core network edge node (which is reached before the core network gateway).

The more important of these QoS attributes include Allocation/Retention priority, and the usual four QoS traffic classes, namely Background, Interactive, Streaming and Conversational. For Interactive traffic, Traffic Handling Priority, THP, is also important. Other important QoS attributes relate to bit rates, for example, assigned bit rate, guaranteed bit rate or maximum bit rate.

In prioritising bearers, the usual known approach is to prioritise bearers dependent on traffic class, with a Conversational class bearer given the highest priority and a Background class bearer given the lowest. Taking into account that there are three traffic handling priority, THP, levels within Interactive class, this gives a six level priority scheme. In consequence, Allocation/Retention priority and bit rate are not considered.

Another known approach is to consider various QoS attributes in a series of hierarchical steps (often referred to as a decision tree) so as to order the bearers in terms of priority. Bearers are sorted in groups according to a first QoS attribute, then further sorted within those groups using a second QoS attribute, and so on. This involves substantial processing in the base station or base station controller. Also, in networks such as UMTS networks, this reordering of bearers for QoS, albeit in order to improve traffic handling performance, is undertaken frequently which has a detrimental effect on the amount of control signalling required and on traffic handling performance.

SUMMARY OF THE INVENTION

The inventor realised that it would be possible to evaluate priority to be afforded to a bearer by considering multiple QoS attributes at a time.

An example of the present invention is a method of determining priorities of radio bearer channels in a wireless telecommunications network that offers various predetermined levels of quality of service. The method involves determining a numerical value representing a priority rating to be applied to a radio bearer channel. This is done by assigning at least two quality of service, QoS, attributes of the bearer channel with a corresponding numerical values, then processing the values to provide the priority rating for the bearer channel.

The bearer priority rating is a single numerical value, making it easy to process in controlling traffic, yet being comprehensive in taking into account multiple QoS attributes appropriately weighted.

The present invention can allow bit rate of a bearer, e.g. guaranteed bit rate, to into account in determining bearer priority. Bit rate can significant impacty how much resources, for example power and network bandwidth, a bearer uses. According, it can be useful to take bit rate into account in prioritising bearers.

BRIEF DESCRIPTION OF THE DRAWINGS

An embodiment of the present invention will now be described by way of example and with reference to the drawings, in which.

DETAILED DESCRIPTION

When considering a known system, the inventor realised that considering each attribute separately and in sequence had disadvantages.

The inventor realised that it would be possible to evaluate priority to be afforded to a bearer by considering multiple QoS attributes at a time.

Example Network

Figure 1:
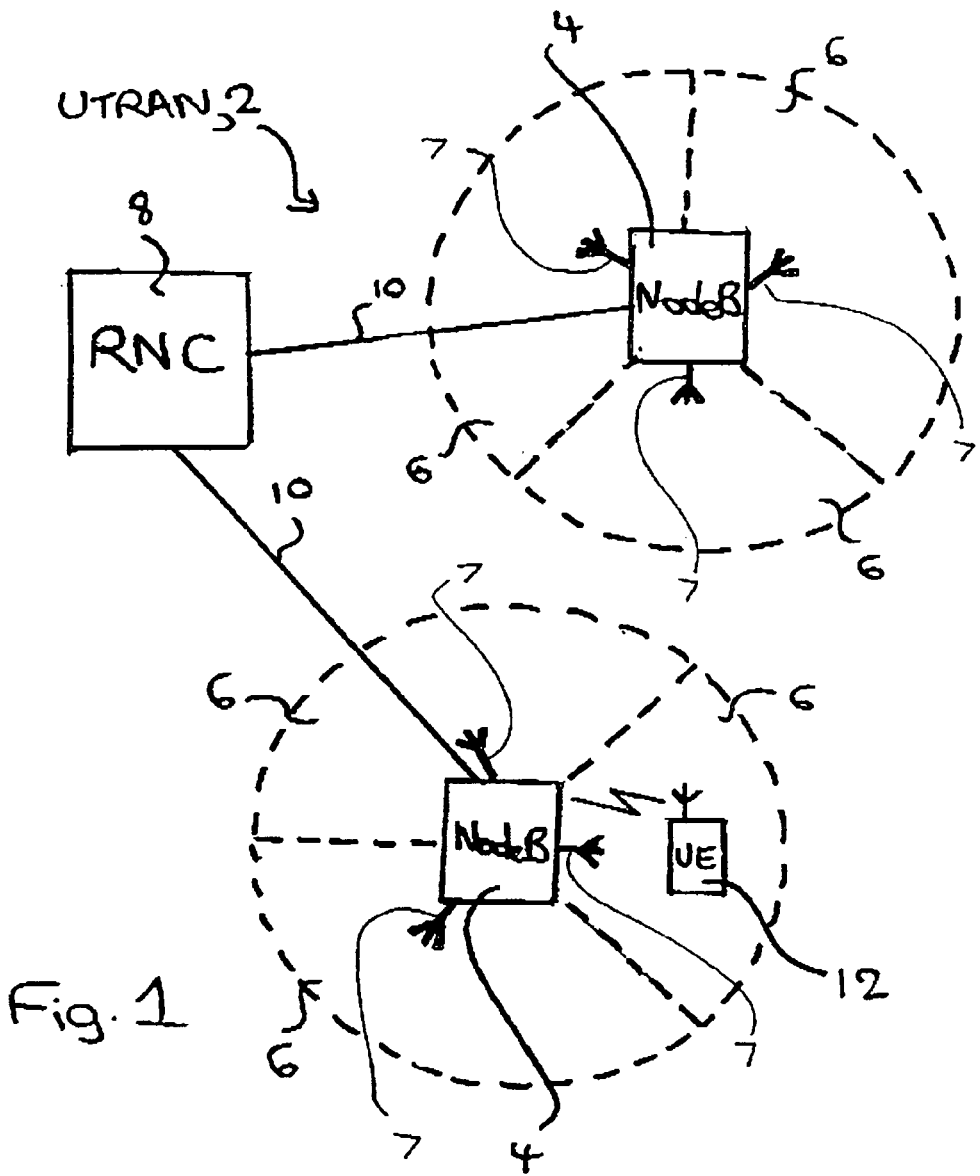
FIG. 1 is a diagram illustrating a network for mobile telecommunications according to a first embodiment of the invention.

An example network is a Universal Mobile Telecommunications System (UMTS) terrestrial access network (UTRAN), which is a type of wideband code division multiple access (CDMA) network for mobile telecommunications. The UTRAN network is basically as shown in FIG. 1. Only one radio network controller and two base stations of the UTRAN network 2 are shown for simplicity. As shown in this Figure, the UTRAN network 2 includes base stations 4. In the Figure, each of the base stations 4 is also designated "Node B" in accordance with UMTS terminology. A cell, also referred to as a sector, is the radio-coverage area served by a corresponding antenna of a base station. Each base station typically has three cells 6, each covered by one of three directional antennas 7 angled at 120 degrees to each other in azimuth. Each radio network controller (RNC) 8 typically controls several base stations 4 and hence a number of cells 6. A base station 4 is connected to its controlling radio network controller (RNC) 8 via a respective interface 10 known as an IuB interface. In use, a mobile user terminal 12 (often referred to as User Equipment (UE) in UMTS terminology) communicates with a serving radio network controller (RNC) 8 via at least one cell 6 of at least one base station 4. In that way, the mobile user terminal communicates with the UTRAN network 2.

QoS Attributes

Communication flows, known as bearers or bearer channels, of call-connections are handled with different priorities in terms of resource allocation dependent on the type of traffic they are carrying.

As mentioned previously, as detailed in Third Generation Partnership Project, 3GPP, Technical Specification TS23.107, in UMTS networks, many QoS attributes that are used to describe how a bearer should be treated have been defined. This is both for end-to-end UMTS bearers, and also for radio access bearers within them. End-to end UMTS bearers are those between mobile user terminal and a core network gateway. Radio access network bearers, often known as RAB bearers, relate to the portion of the data flow path from the mobile user terminal only as far as a core network edge node (that is reached before the core network gateway).

QoS attributes include Allocation/Retention priority (ARP), the four QoS traffic classes, namely Background, Interactive, Streaming and Conversational. For Interactive traffic, Traffic Handling Priority, THP is also important. Other QoS attributes are assigned bit rate, guaranteed bit rate and maximum bit rate.

Prioritising Bearers According to QoS Attributes

Basically to generate a priority rating for a bearer, multiple QoS attributes are taken into account at the same time in order to generate a single number representative of the priority.

Figure 2:
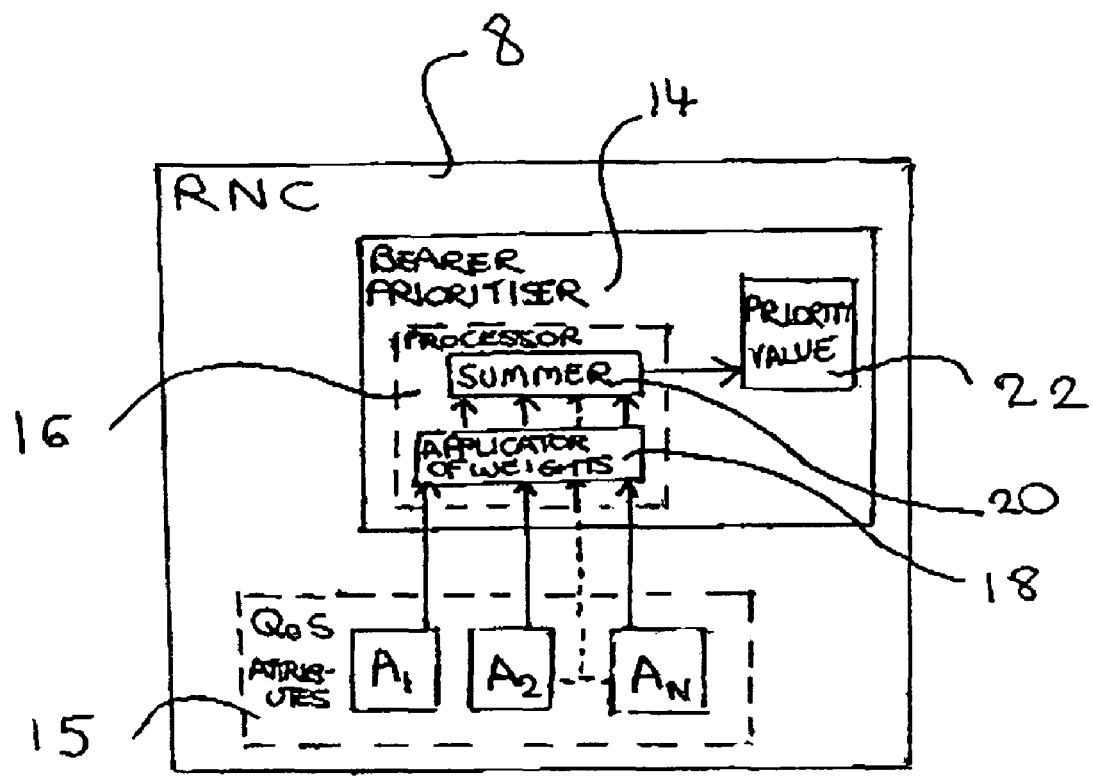
FIG. 2 is a diagram illustrating a radio network controller shown in FIG. 1.

Bearers are prioritised, also often referred to as ranked, in the radio network controller, RNC, 8. As shown in FIG. 2, the RNC 8 that controls the base stations (not shown in FIG. 2) includes a bearer prioritiser 14. The RNC 8 also includes a converter 15 connected as input to the bearer prioritiser 14. The bearer prioritiser 14 includes a processor 16 consisting of an application-of-weights stage 18 for preselected weights and a summer 20. The summer 20 has an output 22.

A bearer priority value is determined by the bearer prioritiser 14.

For any particular bearer, the bearer prioritiser 14 receives associated QoS attributes, denoted $A_1, A_2, \ldots A_N$, in FIG. 2. These attributes, if not already in numerical form, are converted by the converter 15 into numerical form according to predetermined rules. Attributes that are already in number form, such as, for example Allocation/Retention Priority (ARP), bit rate, delay, and/or error rate are used directly.

The attributes in numerical form are passed to the bearer prioritiser 14 and processed in its processor 16 by being appropriately weighted in the application-of-weights stage 18 of the processor 16. An appropriate weight is applied to each of the attribute values. The weight values to be applied are predetermined. The weights are stored for use in the application-of-weights stage 18. The weights are denoted $W_1, W_2, \ldots W_N$, in FIG. 2. The weights were chosen so as to take into account the relative importance of each attribute.

The weighted attributes are then summed by the summer 20 to provide the bearer priority value at an output 22.

This approach can be written as the following formula (formula 1):

$$\text{Bearer priority value} = A_1 * W_1 + A_2 * W_2 + \ldots + A_n * W_n$$

where $A_i$ represents the ith QoS attribute of the bearer, and $W_i$ represents the weight for this attribute, i being an integer value of 2 or more.

The above formula gives a single value for a bearer priority rating so a direct priority comparison amongst bearers is readily undertaken in subsequent allocation of resources to the bearers by the bearer prioritiser 14. The resources are radio resources or other network resources.

The bearer priority value calculation is performed again for a bearer whenever a QoS attribute of the bearer changes.

Particular Example of Weights and QoS Attributes

A particular example of the more general case described above is given by the following formula (formula 2):

$$\text{Bearer priority value} = ARP*10 + \text{traffic class} + \text{guaranteed bit rate}/1000$$

In this specific example, the bearer is a Radio Access Bearer (RAB), Also, Allocation/Retention Priority (ARP) is an integer value. Possible values are ARP=1, 2, 3 for the network which is compliant with any of UMTS standards Release 1 to Release 5. 1 represents a higher allocation/retention priority than 3 does. (In some alternative embodiments (not shown) in accordance with release 6 UMTS standards, ARP can take a value 1, 2, 3, . . . up to 15.)

Also, traffic class is converted to be an integer value using the following fixed relations:

Conversational=1
Streaming=2
Interactive (THP=1)=3
Interactive (THP=2)=4
Interactive (THP=3)=5
Background=6

Furthermore, bit rate is the current assigned radio bearer bit rate. This bit rate complies with 3GPP's permitted bearer rate combinations, and ranges from 8 kilobits per second (kbps) to 384 kbps, using three digits. For example, for formula 2 above, 128 kbps is taken as 128, 64 kbps is taken as 064 (so divided by 1000 will give 0.064) and so on.

Figure 3:
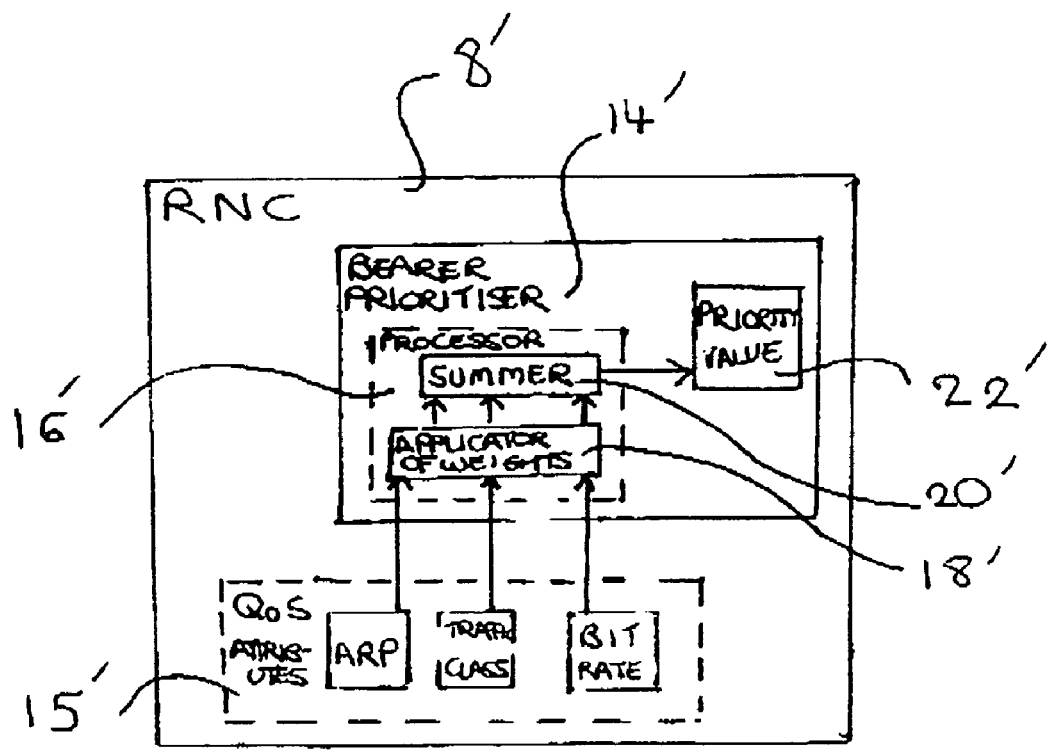
FIG. 3 is a diagram illustrating in more detail an example of the radio network controller shown in FIG. 2.

As shown in FIG. 3, the bearer priority value is determined by a bearer prioritiser 14 in the radio network controller, RNC 8' that controls the base stations (not shown in FIG. 3). The RNC 8 also includes a converter 15 operative to convert QoS attributes associated with a bearer into numerical values according to the predetermined rules explained above. The bearer prioritiser 14' includes a processor 16' consisting of an application-of-weights stage 18' for preselected weights and a summer 20'. The three attributes in numerical form, ARP, traffic class and bit rate, are processed in the processor 16 by being appropriately weighted in the application-of-weights stage 18' of the processor 16' and then summed by the summer 20' to provide the bearer priority value at an output 22'.

The above formula (formula 2) gives a single value for a bearer priority rating so a direct priority comparison amongst bearers is readily undertaken in subsequent allocation of network or radio resources to the bearers by the bearer prioritiser 14.

The smaller the value, the higher the bearer priority.

For example, a bearer for which ARP=2, THP=2, and bit rate is 128 k, is calculated as having a priority value of 24.128. Accordingly, this bearer has lower priority than one for which ARP=1, THP=3, bit rate is 128 k, giving a priority value of 13.128.

Incidentally, the above mentioned bearer of priority value 24.128 also has a lower priority than a 64 k bit rate bearer of equal ARP and THP (giving a priority value 24.064).

Use of Priority Values

The bearer priority values, once determined, are used by the radio network controller for bearer QoS control. This is important as network and radio resources, such as capacity and transmission power, are limited so dynamic QoS control is needed to best handle traffic. Essentially this means that the calculated bearer priorities are used to decide which bearer gets which resources and when.

As an example, two bearers have equal Allocation/Retention Priority (ARP), and THP, but the first has an assigned bit rate of 384 kbps and the second has an assigned bit rate of 128 kbps. Accordingly, the first bearer has a higher calculated priority value than the second bearer so gets a lower priority in terms of resources. If resources become scarce, the first bearer is downgraded to a reduced assigned bit rate of, say, 64 kbps. Its bearer priority value is then recalculated and is found to have reduced. Accordingly, from then it is accorded a higher priority than the second (128 kbps) bearer channel, so the next downgrade in assigned rate, if necessary, will be to the second channel. This is a dynamic and fair approach as it avoids a user having a lower assigned rate being excessively penalised in terms of resource allocation as compared to an, otherwise similar, user currently with a higher assigned bit rate.

General

The approach is flexible, for example, additional, or alternative, QoS attributes can readily be considered.

In some embodiments, rather than performing the above bearer priority calculation again whenever a QoS attribute for a bearer changes, the bearer priority calculation is performed only once, specifically upon bearer setup and is assumed correct for the duration of the call connection.

In some embodiments, weights are selected such that the weights are integer numbers. In some embodiments, weights are selected such that the weighted attributes are also integer numbers. This is for increased ease of processing.

Some embodiments relate to UMTS networks but the inventive approach can also be used in other networks that prioritise bearer channels based on quality of service obligations. Any of the QoS attributes of traffic channels might be used, for example Differentiated Service (DiffServ) code points (DSCP).

The present invention may be embodied in other specific forms without departing from its essential characteristics. The described embodiments are to be considered in all respects only as illustrative and not restrictive. In particular other QoS attributes and/or combinations of QoS attributes could be used, and/or different weights, weight values and/or combinations of weights. For example, weights can be selected such that a lower bearer priority value indicates a lower rather than a higher priority.

The scope of the invention is, therefore, indicated by the appended claims rather than by the foregoing description. All changes that come within the meaning and range of equivalency of the claims are to be embraced within their scope.

The invention claimed is:

1. A method of adapting resource allocations to radio bearer channels in a wireless telecommunications network by determining priorities of radio bearer channels in a wireless telecommunications network that offers various predetermined levels of quality of service, and adapting resource allocations to radio bearer channels dependent on the priority ratings; said determining of said priorities being by in a network controller:

determining a numerical value representing a priority rating to be applied to a radio bearer channel having at least two different quality of service attributes by:

assigning corresponding numerical values to said at least two quality of service attributes of the bearer channel, and processing the values to provide the priority rating for the bearer channel, in which the network is a Universal Mobile Telecommunications System (UMTS) network and one of the attributes is traffic class, the traffic class being selectable from Conversational, Streaming, Interactive (traffic handling priority=1), Interactive (traffic handling priority=2), Interactive (traffic handling priority=3), and Background traffic class, the Conversational traffic class being assigned a value of 1, the Streaming traffic class being assigned a value of 2, the Interactive (traffic handling priority-1) traffic class being assigned a value of 3, the Interactive (traffic handling priority-2) traffic class being assigned a value of 4, the Interactive (traffic handling priority-3) traffic class being assigned a value of 5, and the Background traffic class being assigned a value of 6.

2. A method according to claim 1, in which the values are processed by being weighted and summed.

3. A method according to claim 2, in which the weights are selected such that the weights are integer numbers.

4. A method according to claim 3, in which the weights are selected such that the weighted attributes are integer numbers.

5. A method according to claim 1, in which one of the attributes is allocation/retention priority, and one of the attributes is assigned bit rate.

6. A method according to claim 5, in which the allocation/retention priority is assigned a value between 1 and 15 and is weighted by a factor of 10, traffic class is assigned a value between 1 and 6 and is weight by a factor of 1, and assigned bit rate takes a value representative of kilobits per second and is weighted by a factor of $10^{-3}$.

7. A wireless telecommunications network configured to offer various predetermined levels of quality of service, the network comprising a network node operative to determining a numerical value representing a priority rating to be applied to a radio bearer channel having three different quality of service attributes, the attributes being allocation/retention priority, traffic class, and assigned bit rate;

the network node comprising a converter and a processor;

the converter being configured to assign corresponding numerical values to said three quality of service attributes of the bearer channel;

the processor being configured to process the values to provide the priority rating for the bearer channel, and the network mode being configured to adapt resource allocations to radio bearer channels dependent on the priority ratings, in which the network is a Universal Mobile Telecommunications System (UMTS) network and one of the attributes is traffic class, the traffic class being selectable from Conversational, Streaming, Interactive (traffic handling priority=1), Interactive (traffic handling priority=2), Interactive (traffic handling priority=3), and Background traffic class, the Conversational traffic class being assigned a value of 1, the Streaming traffic class being assigned a value of 2, the Interactive (traffic handling priority=1) traffic class being assigned a value of 3, the Interactive (traffic handling priority=2) traffic class being assigned a value of 4, the Interactive (traffic handling priority=3) traffic class being assigned a value of 5, and the Background traffic class being assigned a value of 6.

8. A method of adapting resource allocations to radio bearer channels in a wireless telecommunications network by determining priorities of radio bearer channels in a wireless telecommunications network that offers various predetermined levels of quality of service, and adapting resource allocations to radio bearer channels dependent on the priority ratings; said determining of said priorities being by in a network controller:

determining a numerical value representing a priority rating to be applied to a radio bearer channel having three different quality of service attributes by:

assigning corresponding numerical values to said three quality of service attributes of the bearer channel, processing the values to provide the priority rating for the bearer channel;

in which the network is a Universal Mobile Telecommunications System (UMTS) network and one of the attributes is traffic class, the traffic class being selectable from Conversational, Streaming, Interactive (traffic handling priority=1), Interactive (traffic handling priority=2), Interactive (traffic handling priority=3), and Background traffic class, the Conversational traffic class being assigned a value of 1, the Streaming traffic class being assigned a value of 2, the Interactive (traffic handling priority=1) traffic class being assigned a value of 3, the Interactive (traffic handling priority=2) traffic class being assigned a value of 4, the Interactive (traffic handling priority=3) traffic class being assigned a value of 5, and the Background traffic class being assigned a value of 6.

* * * * *